Aug. 2, 1932. J. B. FOWLER 1,869,371
RECEIVER SEPARATOR
Filed Jan. 19, 1928 3 Sheets-Sheet 2
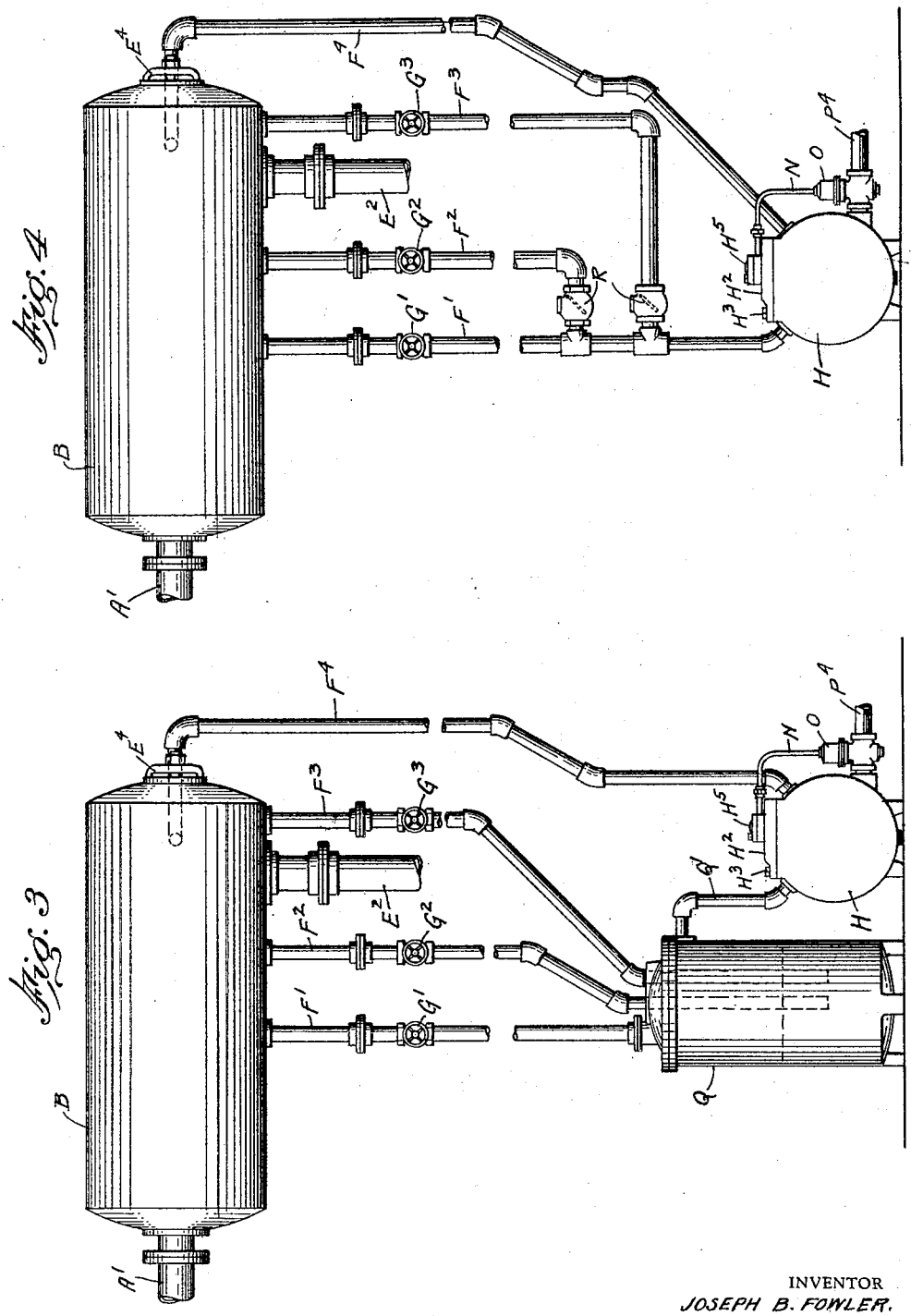
INVENTOR
JOSEPH B. FOWLER.
BY
John E Hubbell
ATTORNEY Aug. 2, 1932.　　　J. B. FOWLER　　　1,869,371
RECEIVER SEPARATOR
Filed Jan. 19, 1928　　　3 Sheets-Sheet 3
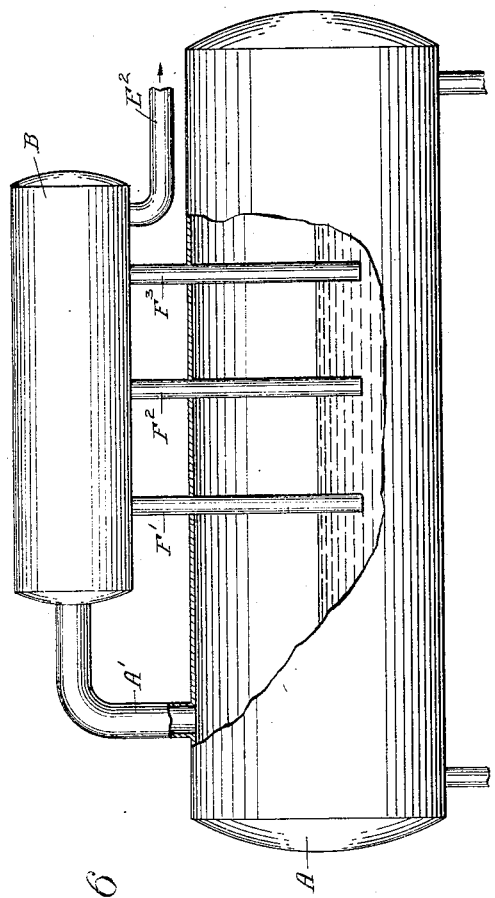
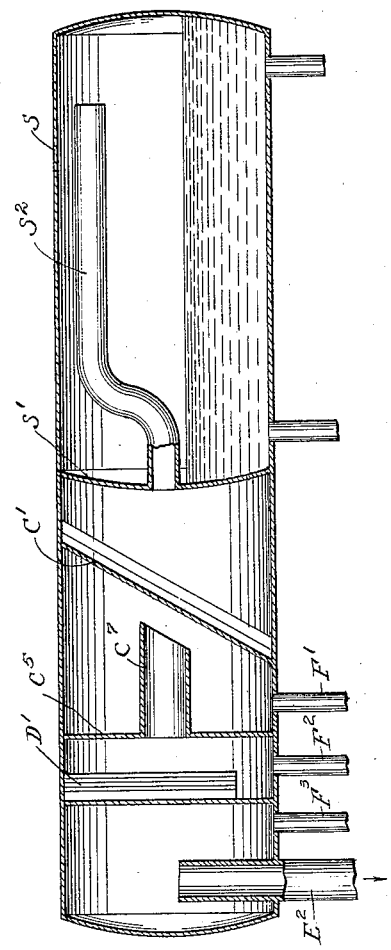
INVENTOR
Jos. B Fowler
BY
John E. Hubbell
ATTORNEY Patented Aug. 2, 1932

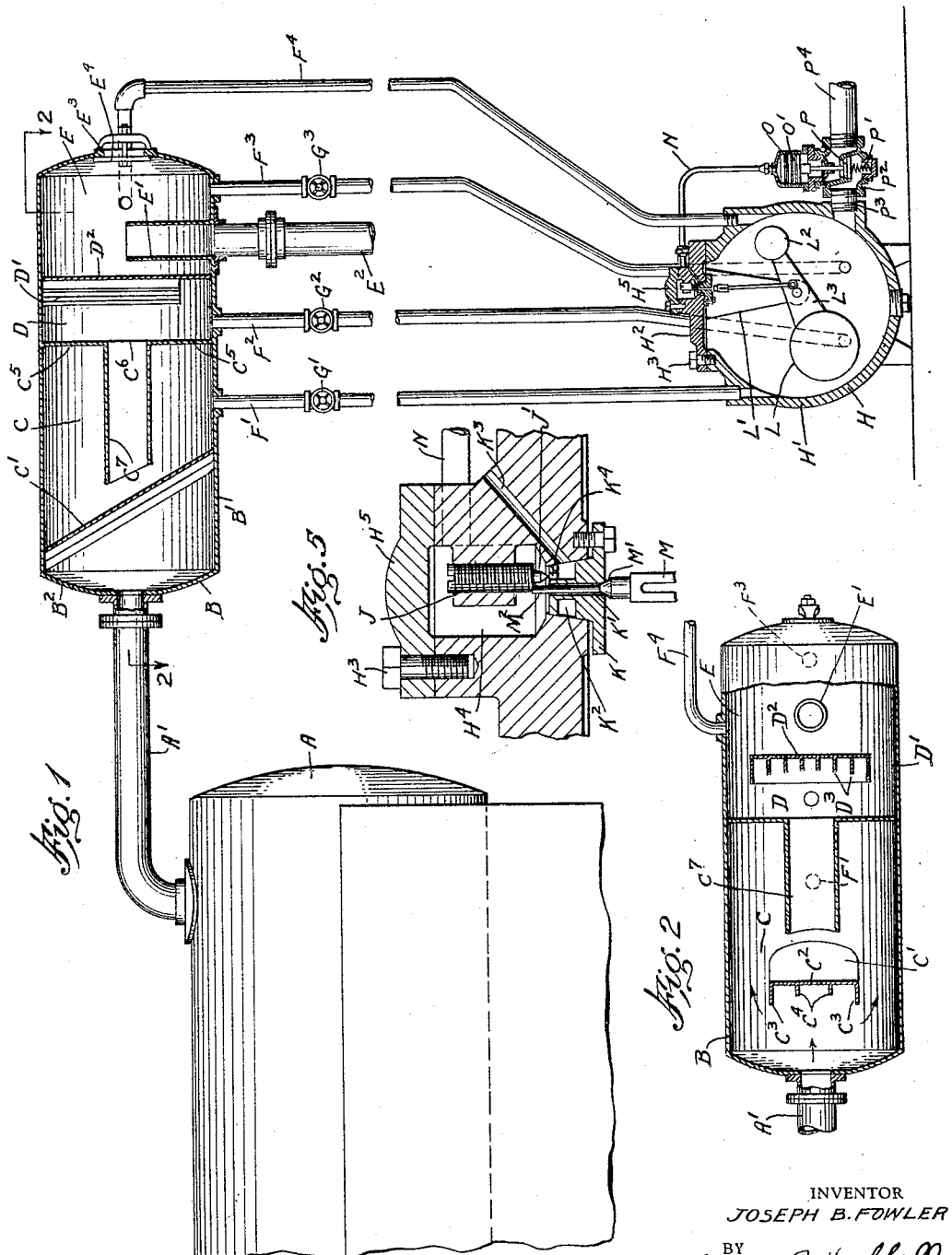

1,869,371

UNITED STATES PATENT OFFICE

JOSEPH B. FOWLER, OF PHILADELPHIA, PENNSYLVANIA, ASSIGNOR TO COCHRANE CORPORATION, OF PHILADELPHIA, PENNSYLVANIA, A CORPORATION OF PENNSYLVANIA

RECEIVER SEPARATOR

Application filed January 19, 1928. Serial No. 247,791.

The present invention relates to apparatus for separating impurities such as water, oil and other undesirable constituents from steam, and to means for removing from such apparatus the separated fluids and solids. The object of the present invention is to provide improved apparatus for separating undesirable liquids and solids from steam and a further object is to provide an improved arrangement and construction of the means for removing such separated liquids and solids from the separating or purifying apparatus without interfering with the normal operation of such apparatus. More specific objects of my invention are to provide an improved arrangement and construction of the baffles in the steam separator and to provide improved means for quickly and effectively draining the separating apparatus.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described preferred embodiments of the invention.

Of the drawings:

Fig. 1 is an elevation partly in section of a preferred embodiment of my invention;

Fig. 2 is a section on the line 2—2 of Fig. 1;

Fig. 3 is an elevation illustrating a modified arrangement and construction of the drainage system;

Fig. 4 is an elevation of another modified form of drainage system;

Fig. 5 is an enlarged view of a portion of the steam trap shown in Fig. 1.

Fig. 6 is an elevation of another modified arrangement; and

Fig. 7 is an elevation partly in section of still another modified arrangement.

In the drawings and particularly in Figs. 1 and 2, I have illustrated a preferred embodiment of my invention, in which steam from a boiler drum A passes through a conduit A' to a steam separator B, of the receiver separator type, wherein water and other undesirable liquids and solids are separated from the steam and drained to a high pressure trap, from which the separated material is automatically discharged from time to time. It is well known in the art that it is highly advantageous to separate water and solid particles from the steam before it can be efficiently used in steam engines and turbines. Water and solid material is carried over from the boiler by priming and foaming in the steam drum and in some cases slugs of water are picked up bodily by the steam and passed into the steam outlet pipe. Water in the cylinder interferes considerably with the operation of a steam engine in that it washes off the lubricating oil from the surfaces, increases the friction and wear between the parts and reduces the efficiency of the engine. It is disadvantageous in steam turbines as the water particles cut the turbine blades and the slugs of water are liable to wreck the turbine. Scale forming matter, water and other impurities in the steam are especially detrimental to the superheater tubes of the boiler.

Water and other impurities are carried over in the steam pipe either as a stream of condensate flowing along the bottom of the pipe or as particles suspended in the steam. In the present construction apparatus is provided for removing the undesirable constituents either when in the form of condensate or when suspended in the steam.

In carrying out the object of my invention, I have provided a steam separator B, having a cylindrical shell B' and an inlet head portion B², to which the steam conduit A' is connected. The steam separator B comprises an inlet chamber C, and an outlet chamber E in series and in both of which means are provided for separating and storing the undesirable liquids and solids carried over by the steam.

In the chamber C is mounted an approach baffle C' inclined with respect to the steam inlet pipe A'. In the construction shown, the baffle C' is arranged at an angle of 45° with respect to the shell B' and inlet pipe A'. The baffle C' consists of a substantially rectangular plate C² connected at its upper and lower curved ends to the shell B' and extending laterally on both sides of the vertical center line of the shell a distance sufficient to intercept practically all of the steam entering the chamber C. Projecting from the front side of the baffle plate C² are ribs C³ and C⁴ perpendicular to the baffle plate and parallel with each other. The ribs C³ are located at the outer ends of the baffle plate and project a greater distance than the inner ribs C⁴ for a purpose hereafter described. As shown in Fig. 2, passages are left on both sides of the baffle C'.

A circular partition plate C⁵ is vertically positioned in the separator with its periphery secured to the shell. The plate C⁵ has a circular opening C⁶ at the center portion thereof. A pipe C⁷ is connected to the plate surrounding the opening C⁶ to form a passage thereto. The pipe C⁷ projects into the chamber C to a point adjacent the rear side of the baffle plate C², whereby the flow path of substantially all of the steam in the chamber is sharply reversed before its discharge to the chamber E.

The chamber E receives steam through the pipe C⁷ from the chamber C. The chamber is provided with a main baffle D' extending across the major portion of the shell at a point adjacent the rear side of the partition C⁵. The baffle D' comprises a vertical baffle plate D² secured at its upper and lower ends to the top and bottom of the shell, respectively. Integrally mounted on and projecting from the front face of the baffle plate are a series of parallel vertical ribs D³. The ribs extend vertically down the major portion of the baffle to a point below the lower end of the circular opening C⁶. The ribs are divided into a number of pairs, each of which is symmetrically located with respect to the vertical center line of the shell and so constructed that as the distance from the center line increases the farther the ribs project from the face of the baffle plate.

The outlet chamber E is also provided with a steam outlet pipe E', which is vertically arranged in the chamber with its lower end secured in the bottom of the shell B' and its upper end opening to the chamber at the rear of the baffle D'. The upper open end of the pipe is preferably arranged in a horizontal plane. The lower pipe end is connected to a steam discharge pipe E² leading to a superheater or to apparatus in which the dry steam is utilized. A manhole opening E³ and cover E⁴ are arranged in the outer end of the separator shell to provide means of access to the separator for cleaning or repairs.

In the apparatus heretofore described, steam carrying entrained moisture and solid material passes from the boiler A through the conduit A' into the separator. The steam flow is at high velocity and the heavier liquid and solid particles tend to maintain their direction so that on entering the chamber C they impact against the approach baffle C' and adhere to the baffle structure. The steam passes around the side edges of the baffle and out through the passage C⁶. The particles adhering to the baffle structure are free to flow downwardly between the ribs as there is little, if any, steam velocity between the ribs. The condensate flowing along the bottom of the pipe A' also drops to the bottom of the separator and flows with the separated fluid and solid particles around the lower end of the baffle C' to a drain pipe F' connected to the bottom of the chamber C at a point below the middle portion of the outlet conduit C⁶.

The steam passing around the baffle C' to the outlet conduit usually contains a small quantity of water and solid particles that have escaped separation by the baffle C' and which are carried with the steam through the conduit pipe C⁷ into the chamber E. The flow of steam into the chamber E strikes the baffle D' and in this portion of the separator substantially all of the water and solid particles remaining in the steam are removed by the contact with the baffle D' and flow down the baffle to the bottom of the chamber E, where they are removed by a drain pipe F², connected to the bottom of the chamber E.

The steam after contact with the baffle D' flows around the side edges of the baffle structure to the steam outlet pipe E'. Any moisture separated from the steam after it passes from the baffle D' is removed through a drain pipe F³, connected to the bottom of the chamber E at the side of the steam outlet pipe E'.

The projecting ribs on each baffle plate provide a large surface contact with the steam flow and subject the steam to a "scrubbing" action, which increases as the steam flows toward the side passages, assisting greatly in the separation of the impurities. The drainage system for the separator comprises the pipes F', F² and F³ connected to a common receiver in the form of a high pressure steam trap H provided with an automatic discharge system. Cutoff valves G', G² and G³ are located in the respective pipes F', F² and F³.

As shown the steam trap H comprises a globular body H' and a bonnet H² secured to the body by bolts H³. The bonnet is formed with a central chamber H⁴ for a pilot valve J. A cover plate H⁵ closes the top of the chamber H⁴. The lower end of the chamber is closed by a tapered plug member K having a central passage K' therein and an annular chamber K² connected at one side to a passage K³ in the bonnet leading to atmosphere. A communicating passage K⁴ connects the chamber H⁴ to the annular chamber K².

The pilot valve J comprises a cylindrical body having a cone shaped extension J' at the lower end thereof arranged to close the upper end of the passage K⁴. In the main trap chamber is located an aluminum float L secured to a lever arm L³ pivotally mounted in a hanger L' and provided with a counter weight L². An arm M is pivotally connected to one side of the lever arm L³ and provided at its upper end with a tapered section M' and a cylindrical rod M². As shown in Fig. 5, the tapered section M' is arranged to close the lower end of the passage K' and the top of the rod M² is arranged to contact with the lower end of the pilot valve J. A pipe N connects the upper end of the valve chamber H⁴ to the top of a motor valve chamber O. A piston O' is vertically movable in the valve chamber O and arranged to unseat a discharge valve P against the action of a spring P' located in the valve body P². The valve body is connected to the lower part of the trap chamber by a nipple P³.

With the steam trap arrangement described the float L rises and falls with the level of the liquid in the trap chamber. As the level of the liquid rises the float moves to open the passage K', close the passage K⁴ thus permitting the steam collecting in the top of the trap chamber to act on the piston O', unseat the valve P and discharge the contents of the trap chamber to the discharge pipe P⁴. As the level of the liquid in the trap chamber falls the float L moves to close the passage K', open the passage K⁴ and permit any steam in the chamber H⁴ and pipe N to pass out the passage K³ to atmosphere. With the drop in pressure above the piston O', the valve P is automatically seated by the action of the liquid passing out and the spring P'. While well adapted to the use to which it is put, the specific form and construction of the trap H shown forms no part of the present invention.

In the construction shown, the drain pipes F² and F³ are sealed by the liquid in the trap chamber. This is necessary as the steam pressure in the separator chamber E is less than the pressure in the chamber C and if the pipes F² and F³ were not sealed the liquid descending in those pipes would be forced back into the separator by the higher pressure of the steam from the separator chamber C which has collected in the trap chamber. The sealing of the drain pipes provides a head of water in those pipes sufficient to overcome the difference in steam pressure in the compartments. It is not necessary that the pipe F' be sealed but in some cases it may be advantageous to do so. A pressure equalizing pipe F⁴ connects the upper part of the trap chamber to the separator chamber E to equalize the pressures therein.

In the modification illustrated in Fig. 3, the drainage system also comprises a common receiver Q for all of the drain pipes. The receiver Q is connected at its upper end by a pipe Q' to a high pressure trap of the type illustrated in Figs. 1 and 5. This arrangement of a common receiver and trap attains the same result of preventing recirculation of the liquid and solids separated out from the steam.

As shown in Fig. 4, the common receiver may be omitted and the pipes F² and F³ provided with check valves R in the lower end thereof to prevent any back flow of the separated products. In this construction all of the pipes are drained into a high pressure trap.

In Fig. 6 I have illustrated a modified arrangement in which the steam and water drum A of a boiler has mounted thereon a receiver separator B of the type shown in Figs. 1 and 2 and connected thereto by a steam outlet pipe A'. The steam passes through the separator in the manner disclosed heretofore and out through the steam outlet pipe E². In this arrangement the drainage pipes F', F² and F³ pass down into the drum A and are sealed by the water therein.

In Fig. 7 I have illustrated another modified arrangement that is especially suitable for high pressure boiler installations in which it is desired to equip the boiler with a steam purifier. In high pressure installations of this type, the cost of an external purifier is very high and the present arrangement combines the purifier with the steam and water drum of the boiler, thereby reducing the total cost of the apparatus. As shown in Fig. 7, the boiler drum S is extended longitudinally and provided with a false header S' for the steam and water section of the drum. The drum extension is provided with a steam separating and purifying apparatus of the type disclosed in Figs. 1 and 2 and comprises the approach baffle C', the partition plate C⁵ and pipe C⁷ connected thereto, and the main baffle D'. Steam is passed into the separator section by a steam pipe S² located above the water level in the drum and connected to an opening in the false header S'. After passing through the purifying apparatus, the steam passes out through the pipe E² to the superheater or other apparatus as may be desired. Drainage pipes F', F² and F³ for the separator chambers are provided as heretofore described in the separating system and drain the moisture and other impurities in the steam into a common receiver as shown in Figs. 1, 3 or 4 wherein the pipes are sealed.

My invention is characterized by the simplicity of the apparatus and by its effectiveness and reliability in operation. With the apparatus illustrated I have attained practically perfect separation of the moisture and solid particles from the steam with substantially dry steam passing out of the steam outlet pipe. The arrangement of the drainage pipes provides a highly efficient draining of the separator and the sealing of the pipes or the use of check valves insure the effective disposal of the separated products.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. The combination with a steam separator having a steam inlet thereto and comprising a plurality of chambers for a series flow of steam therethrough, a passage connecting said chambers, a baffle located in each of said chambers, of a common receiver normally containing a body of liquid, and means for separately draining said chambers in said receiver comprising a separate pipe connection from each chamber to said receiver, one of said connections being normally sealed in said receiver.

2. The combination with a steam separator connected at one end to a steam inlet pipe and comprising a plurality of chambers, an approach baffle located in one of said chambers adjacent said steam inlet pipe, a passage connecting said chambers, a baffle located in another of said chambers, of means for separately draining each of said chambers, said means comprising a steam trap, a connection between each of said chambers and said trap, and means for automatically discharging said trap when the liquid therein reaches a predetermined level.

3. The combination with a steam separator having a steam inlet thereto and comprising a plurality of connected chambers wherein liquid impurities are separated from the steam passing through, of pipe connections for separately draining the liquid impurities from each chamber, and means associated with said pipe connections for preventing circulation of the separated liquid in said separator chambers.

4. The combination with a steam separator having a steam inlet thereto and comprising inlet and outlet chambers, a passage connecting said chambers for a series flow of steam therethrough, and a baffle located in each of said chambers, of means for separately draining said chambers comprising a common receiver, a separate pipe connection from each chamber to said receiver, the pipe connection from said outlet chamber having a liquid seal in said receiver.

5. Steam purifying apparatus comprising in combination, a separator having an elongated shell including steam inlet and outlet chambers arranged in series, a baffle in each of said chambers arranged to intercept substantially all of the steam passing through the corresponding chamber, a partition extending transversely of said shell and separating said chambers, an elongated steam conduit extending from said partition to a point adjacent the rear side of said inlet chamber baffle and providing a series flow of steam through said chambers, a steam outlet pipe opening to said outlet chamber, external pipes separately connected to each of said chambers for the discharge of the material separated from the steam by said baffles, and means associated with said pipes for preventing the return of said material to said chambers.

6. Steam purifying apparatus comprising in combination, a separator having an elongated shell including steam inlet and outlet chambers arranged in series, a separating baffle in each of said chambers arranged to intercept substantially all of the steam passing through the corresponding chamber, a partition extending transversely of said shell and separating said chambers, an elongated steam conduit extending from a central opening in said partition to a point adjacent the rear side of said inlet chamber baffle and providing a series flow of steam through said chambers, a steam outlet pipe opening to said outlet chamber above the bottom of said shell, external pipes separately connected to each of said chambers for the discharge of the material separated from the steam by said baffles, and means associated with said pipes for preventing the return of said material to said chambers.

7. Steam purifying apparatus comprising in combination, a separator having an elongated shell including steam inlet and outlet chambers arranged for a series flow of steam therethrough, a baffle plate in each of said chambers arranged to intercept substantially all of the steam passing through the corresponding chamber, vertical ribs on said plates extending transversely to the steam flow, the projection of said ribs from said plate increasing from the plate center to the side edges, a steam outlet pipe opening to said outlet chamber, external pipes separately connected to each of said chambers for the discharge of the material separated from the steam by said baffles, and means associated with said pipes for preventing the return of said material to said chambers.

Signed at Philadelphia, in the county of Philadelphia, and State of Pennsylvania, this 13th day of January, A. D. 1928.

JOSEPH B. FOWLER.